May 26, 1959  G. J. SCHOWERER ET AL  2,888,260
REGISTRATION CONTROL APPARATUS

Filed Oct. 19, 1955  7 Sheets-Sheet 1

INVENTORS.
GEORGE J. SCHOWERER
MORRIS SORKIN
BY James and Franklin
ATTORNEYS.

May 26, 1959 G. J. SCHOWERER ET AL 2,888,260
REGISTRATION CONTROL APPARATUS
Filed Oct. 19, 1955 7 Sheets-Sheet 2

INVENTORS.
GEORGE J. SCHOWERER
MORRIS SORKIN
BY
James and Franklin
ATTORNEYS.

FIG. 5

INVENTORS.
GEORGE J. SCHOWERER
MORRIS SORKIN
BY James and Franklin
ATTORNEYS.

May 26, 1959 G. J. SCHOWERER ET AL 2,888,260
REGISTRATION CONTROL APPARATUS
Filed Oct. 19, 1955 7 Sheets-Sheet 6

FIG. 8

INVENTORS.
GEORGE J. SCHOWERER
MORRIS SORKIN
BY James and Franklin
ATTORNEYS.

United States Patent Office 2,888,260
Patented May 26, 1959

2,888,260

REGISTRATION CONTROL APPARATUS

George J. Schowerer, West Englewood, N.J., and Morris Sorkin, New York, N.Y., assignors to Champlain Company, Inc., Bloomfield, N.J., a corporation of New York Application October 19, 1955, Serial No. 541,342

27 Claims. (Cl. 271—2.6)

This invention relates to registration control, and more particularly to improved apparatus for the same.

There are many instances in which units operating on a web must be kept in proper registration. A common example is multi-color printing in which each printing unit applies a different color on a travelling web. Often a cutting press or punch press or like apparatus follows one or more printing units, and a scoring, punching, or cutting operation must be kept in accurate registration with the printing on the web. Sometimes a web is preprinted and must be kept in registration with an additional printing unit or/and a cutting press. In referring briefly to a cutting press it is intended to include varied operations such as scoring, perforating, punching, or cutting sheets from a web for stacking.

The problem is not solved by initial registration, for registration must be maintained while dealing with a web travelling at high speed, say, 1,000 or even 1,500 feet per minute. The web may shrink slightly or stretch slightly. Changes in humidity, temperature, tension, acceleration, deceleration, or stopping of the web, all may introduce changes in registration which must be corrected or compensated.

The primary object of the present invention is to generally improve registration control apparatus. A more specific object is to improve the registration control apparatus disclosed in U.S. Patent 2,348,862 granted May 16, 1944 to Morris Sorkin (one of the present joint inventors). In accordance with the teaching of that patent, a marker is printed as a part of the first impression on the web and this is scanned by an electric eye, thus producing a pulse which is compared in timing with a pair of adjustably spaced pulses produced by an optical system or "phase detector" including a light source and a pair of slits in a drum which is rotated by the machine shaft. For proper registration the scanning pulse is kept in the dead zone between the phase detector pulses. A shift of the scanning pulse to either of the phase detector pulses represents a lag or lead of the web, and the coincident pulses are employed to initiate the feed of a correction increment into the machine shaft in proper direction to shift the scanning pulse back into the dead zone between the phase detector pulses.

One object of the present invention is to greatly improve the accuracy of registration obtainable in electric eye registration systems using a scanner pulse. For this purpose the marker on the web is not itself used as a measure of the scanning pulse duration. Instead the starting edge (or, if desired, the terminal edge) of the marker is used to trigger an exceedingly sharp pulse having a duration of say, two microseconds. This corresponds to only a very small fraction of the registration tolerance required or sought. Additional advantages of this improvement are that the marker printed on the web may be long or short, and indeed it need not be a special marker at all. Any suitable part of the illustration or printed matter may itself be used to trigger the sharp scanning pulse.

Further objects of the invention center about the problem of initially setting up the apparatus. More specifically, one may manually control registration motors to bring successive operations into registration, but to automatically maintain that registration it is necessary to properly orient the phase detectors, or, more specifically, in the present case, the optical system of the phase detector relative to the slotted drum, which in turn is secured to the machine shaft (e.g. the printing cylinder, cutting cylinder, or the like). When dealing with a large installation, say an eight-color press, this may be a considerable task. The problem is made more difficult by the volatile or quick-drying inks employed in high speed presses, making it important not to stop a press for too long a time with the web under pressure. On the other hand, the impression roll cannot be backed away to relieve the pressure because that would itself spoil the registration. Considerable time and a great deal of web may be wasted in setting up the apparatus.

An object of the present invention is to overcome this difficulty, and to greatly simplify and expedite the so-called "phasing" operation, that is, putting the phase detectors into proper position. For this purpose the phasing operation is divided into two main parts. The first is a rough phasing operation, performed manually (pushbutton control). This is done with the web standing still, but the operation is so expedited by the present apparatus that it is performed rapidly. The second part is a fine phasing operation, which is produced automatically with the web either standing still or travelling, as desired.

In accordance with a further feature and object of the present invention, "standstill phasing" is aided by generating and feeding to the phase detector a series of pulses, corresponding in function to the scanning pulses produced when the web is travelling at high speed. The phase detector is phased under manual control over any necessary large angle until the so-called "operating zone" is reached, this being a narrow zone comprising only the two slits and the dead zone therebetween. The remotely controlled phasing motor may be speeded up for rough phasing, and flashing indicator lights instantly show when the operating zone is reached, so that the rough phasing operation may be hastened from unit to unit until all have been roughly phased. Preliminary to this operation the web is "inched" under manual control to put the marker beneath the "scanner."

After the rough phasing operation, by flicking appropriate switches a fine phasing operation is brought about whereby the phase detectors are adjusted slightly to bring the scanning pulse in the dead zone between the phase detector pulses. This is evidenced on a control panel when flashing lights for the different units are extinguished. The web then may be started and fine phasing continued, using true scanner pulses, instead of locally generated pulses. This may be done without the previous step, that is, the web may be started for all of the fine phasing. By then flicking appropriate switches the automatic control circuits are applied to the registration motors which feed leading or lagging motion to the printing or cutting cylinders, thus maintaining the units in registration. In accordance with one feature and object of our invention, the same automatic control circuitry may be used for either the registration motors or the phasing motors.

As heretofore designed the correction circuit is reset at the end of each revolution of the printing cylinder. Thus there is an opportunity to stop the correction whenever it is adequate. However, such a system suffers from the disadvantage that there may be over-correction when the web is moving slowly or is stopped, for there would be no means to reset the circuit and thus terminate the feeding in of correction movement. In accordance with a further feature and object of the present invention the correction may be changed from a continuous to an intermittent correction. Differently expressed, the circuit is provided with timing means which resets the circuit automatically at the end of a desired time interval, and independently of the press or web speed. Moreover, the change to an intermittent correction is preferably made automatically, as by means of a centrifugal switch.

To accomplish the foregoing general objects, and other more specific objects which will hereinafter appear, the invention resides in the registration control elements, and their relation one to another and to the machinery or presses controlled thereby, as are hereinafter more particularly described in the following specification. The specification is accomplished by drawings, in which:

Figure 1:
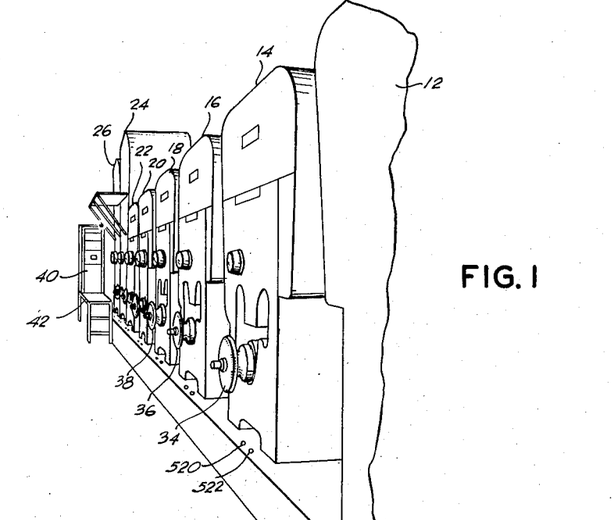
Fig. 1 is a fragmentary perspective view showing a multi-color press to which the invention is applied.

Referring to the drawing, and more particularly to Fig. 1, a multi-color rotogravure printing press is there shown. This is an eight-unit press, it comprising printing units 12, 14, 16, 18, 20, 22, 24 and 26. The last two units 24 and 26 are shown with elevated drying hoods, which may be required when printing on the reverse side of the web. In such case the press would be a six-color press on one side of the web and a two-color press on the other side. However, the elevated hoods at 24 and 26 may be employed for a different purposes, as, for example, extended drying when the final printings employ a varnish which requires extra drying time. The handles 34, 36, 38 are disposed coaxially of the gravure printing cylinders and serve two purposes. One is to rotate a screw for axial adjustment of the cylinder for side-to-side register. The other is to help pull the cylinder axially out of the press. The cylinder is usually driven by means of a splined connection at the opposite end, and by pulling the cylinder partway out of the press it may be turned and restored in different orientation. Thus a very rough registration may be accomplished manually within an angle of, say, thirty degrees.

In accordance with the present invention a control panel 40 is disposed alongside the press line, preferably at one end. This may be raised on a platform 42 so that an operator at the control panel may observe the printed web as it leaves the last press unit 26. It is also helpful when the operator cooperates with another who moves from unit to unit, as later described.

Figure 2:
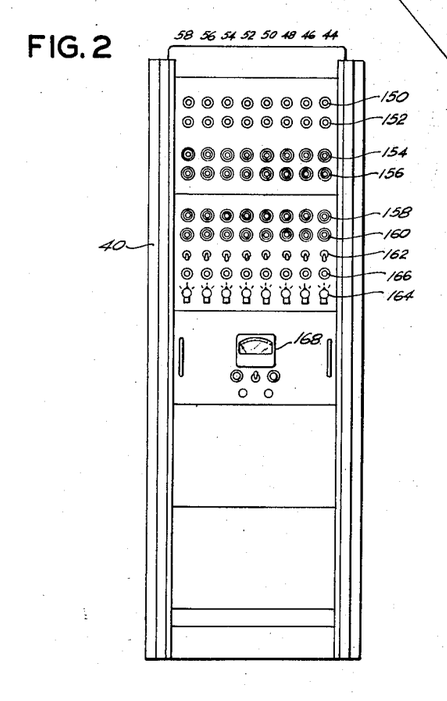
Fig. 2 is a front elevation of a control panel forming a part of the apparatus (as shown at the left end of Fig. 1)

The control panel 40 is shown to larger scale in Fig. 2 of the drawing. The controls and signal lights for each unit are disposed in vertical alignment. In the present case there are eight columns indicated at 44, 46, 48, 50, 52, 54, 56 and 58. Seven of these columns correspond to seven of the printing units 14—26, respectively. There is no control column corresponding to the first printing unit 12 because this unit (or theoretically any single one of the units) is uncontrolled, and the others are controlled for registration with the uncontrolled unit. Nevertheless the control panel 40 preferably has eight columns, the eighth column (marked 58) being provided for a cutting press or the like following the printing units. The extra column 58 is to provide for synchronization of "cut to print."

Figure 3:
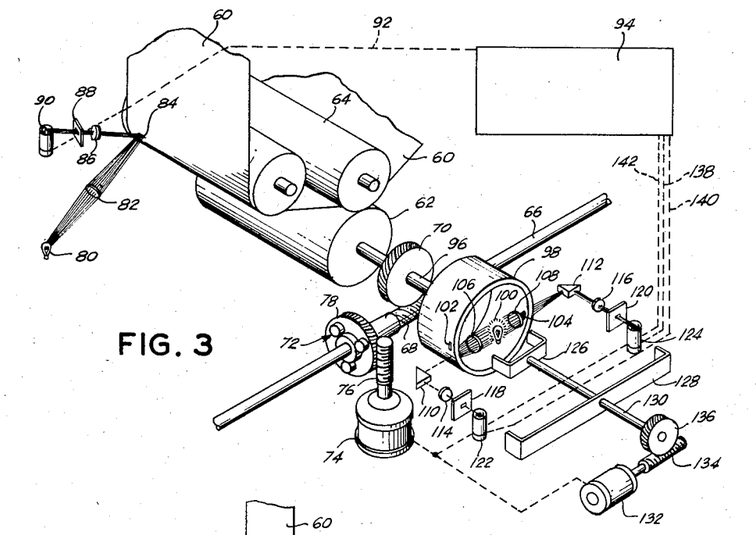
Fig. 3 is a perspective view schematically explanatory of the registration control elements to which the present improvements are applied.

Referring now to Fig. 3, this illustrates the basic photoelectric eye scanning and phase detection system which is used in the present apparatus. Much of the system shown in Fig. 3 is disclosed in the aforesaid Letters Patent 2,348,862. In Fig. 3 the web 60 is run between a gravure printing cylinder 62 and an impression cylinder 64. The gravure cylinder 62 is driven by a main shaft 66 running along the line of presses. It drives the cylinder through helical gearing 68 and 70, but between shaft 66 and helical gear 68 there is interposed a differential gear mechanism or so-called "running register mechanism," schematically indicated at 72. This permits the introduction of a lagging or leading motion, for correction of registration, and this is schematically indicated in the present case by the provision of a register motor 74, connected through worm 76 and gear 78 to a part of the running register or differential gear mechanism.

As so far described the control may be manual. However, there is also a web scanner, comprising a light source 80 and a focusing lens system 82 to illuminate web 60, and more specifically a marker 84 printed on the web. Reflected light passes through a lens yarns system 86 and a slit 88 to a photo cell or so-called "photoelectric eye" 90. Scanning pulses are carried through conductors indicated by dotted line 92 to a box or housing 94 within which appropriate circuitry is housed, as described later.

The shaft 96 of gravure unit 62 carries a rotatable drum 98 forming a part of the phase detector unit. This comprises a lamp 100 within the drum, for illuminating two slightly displaced slits 102 and 104. It is convenient to make the slits nearly diametrically opposite, instead of immediately adjacent, and to provide them with separate optical systems, but the net effect is as though the slits were on the same side of the drum and only slightly displaced. With the arrangement shown the displacement may be made as little as wanted, down to zero, but in practice the displacement is made adjustable from, say, zero to 0.015", and is normally used at a value of, say, 0.005".

Light from lamp 100 is focused by lens systems 106 and 108, and after passing through the slits is reflected by prisms 110 and 112 to lens systems 114 and 116 and thence through slits 118, 120 to photoelectric cells 122 and 124. The optical system remains stationary while the drum rotates, but in initially setting up the apparatus the optical system may be turned to proper orientation. For this purpose the entire phase detector or "head," other than the cylinder 98, is mounted for rotation. For convenience the rotation may be carried through 360°, and electrical connections are made through slip rings, not shown. In the present drawing the rotational adjustment is schematically indicated by a yoke 126 carrying the lamp and lenses within the drum, and another yoke 128 carrying the optical systems outside the drum, these yokes being carried by shaft 130. In accordance with the present invention the shaft is adjusted under remote control (or/and automatically, as later described) by means of a motor 132 and suitable reduction gearing such as worm 134 and worm gear 136.

The pulses generated by momentary passage of light through slits 102, 104 are conveyed to housing 94 by circuitry indicated in broken lines at 138, 140. There is also suitable circuitry 142 leading to motor 74 and motor 132.

The means for adjustment of the dead zone between the slits 102 and 104 is not shown, but in practice it is convenient to relatively adjust the optical systems rather than the slits, and the slits themselves may be diametrically opposed, that is, 180° apart, corresponding theoretically to zero dead zone. However, for simplicity the description refers to displacement of the slits, with a dead zone between the slits.

Reverting now to Fig. 2, in each column there are indicator lights 150 and 152, which are usually one green to indicate advance, and one red to indicate retard. The next elements are manually operable pushbuttons 154 and 156 which again are for advance and retard and which, if desired, may be colored like the lamps. These control the register motor 74 (Fig. 3) which advances or retards the gravure cylinder through the running register gearing 72. The next lower elements 158 and 160 (Fig. 2) are pushbuttons which again correspond to advance and retard and which may be appropriately colored, but which control the phasing motor 132 (Fig. 3), which turns the so-called "barrel" of the phase detector, symbolized by the yokes 126, 128.

The next lower element is a toggle switch 162 which may be wired in either of two ways. In one way the switch selects as between coarse and fine phasing. When first setting up it may be necessary to turn the phase detector a large amount, and to save time the motor may be operated at high speed, but when the phase detectors have been phased enough to bring them into the operating zone the ensuing adjustment, preferably made automatically as later described, is a precise one, and the motor speed is reduced for appropriately slow movement. The switch 162 is put in coarse position for so-called "standstill phasing." In the other way of wiring switch 162 it functions also to initiate generation of pulses which are employed in the system in lieu of the scanning pulses produced when the web is travelling. Both can be combined in one switch if double pole double throw.

The bottom element in each column is a three-position selector switch 164, and has an indicator light 166 associated with it. The selector switch 164 selects as between "Phase," "Manual," and "Register." As here wired the center position is for "Manual," and the pushbuttons alone then take full control. One side position is used when "phasing," that is, adjusting the position of the phase detectors, and the other is for automatic register control, that is, normal operation. The pilot lamp 166 is lighted in the latter condition.

While describing the panel 40 it may be mentioned that the meter 168 is a voltmeter to show whether a voltage regulator forming a part of the system is functioning correctly, the system being supplied with a regulated voltage in order to avoid possible error from that source.

Figure 4:
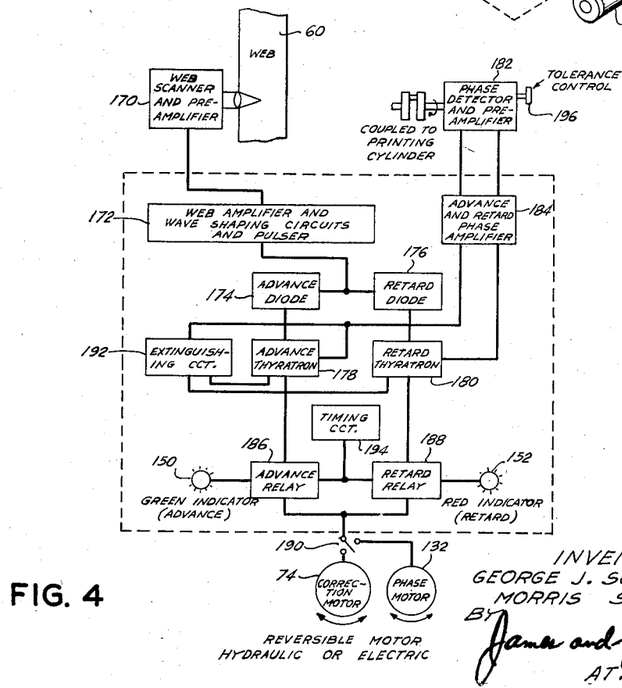
Fig. 4 is a block diagram explanatory of the present invention.

In order to better understand a description of the box diagram of Fig. 4, and the wiring diagram of Figs. 5-8 it may be helpful to first describe the setting up of the apparatus.

The press is cleaned up; a new web is threaded through the press; new inks are put into the tanks; the new cylinders are inserted; and the press is run slowly to get some idea of color correctness, sharp impression, and registration. The initial step in registration is to manually pull each gravure cylinder axially by means of handles 34, 36 (Fig. 1) and to re-insert it at the nearest spline of its mechanical connection. The next step is to put the bottom switch 164 (Fig. 2) on "Manual" and to then use the pushbuttons 154, 156 for better register, enough to bring the different prints into as good register as is desired, say, 0.010″ or 0.015″.

Next the barrels or optical systems of the phase detectors must be set up. Standstill phasing helps save web waste. The operator stops the press, keeping the impression cylinder 64 (Fig. 3) down so as not to lose web tension. He, or preferably an assistant at the press unit, then inches the web along, by means of jog buttons located at each unit, until the marker 84 on the web 60 reaches the scanner, and is there stopped. In Fig. 1 there are two buttons 520 and 522 at the side of each unit. One is a stop button, and the other is a so-called "jog" button which operates the main driving motor only so long as the button is depressed, and may be used to inch the web along when desired.

The operator puts the toggle switch 162 (Fig. 2) in closed or "coarse" position, and by means of the manual buttons 158, 160 for phasing motor control, he rotates the barrel until the slits reach the marker. In doing this he is aided by the indicator lights 150, 152 at the top, for when he reaches the "operating zone" he sees a series of flashes. He preferably stops when he sees 5 flashes, as indicating that he is close enough. He could move beyond the flashes to the dead zone position between red and green flashes, but in practice there is no point doing this because the manually stopped position of the marker on the web is itself not accurate. Moreover, haste is important when the web is stopped.

This standstill phasing procedure is rapidly repeated for each of the units, the assistant moving from unit to unit. The operator then puts all of the toggle switches 162 to "normal" instead of "coarse" position, and restarts the web, preferably at reduced speed. He changes the bottom switches 164 from "Manual" to "Phase" position. This provides automatic adjustment of the phase detector barrels. This further and more closely adjusts the barrel positions with the web in motion, and this is done not only automatically but all units simultaneously. During this operation the top lights 150, 152 are flashing busily, but when proper adjustment has been secured the lights go out. The operator swings the bottom switches 164 over to "Register," whereupon the system takes over control of the gravure printing cylinders to maintain registration despite other variables which may come in. The switching may be done one at a time or all at once, preferably the former.

Figure 2A:
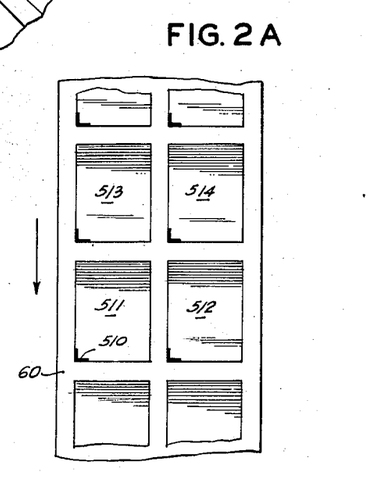
Fig. 2a is a fragment of a printed web.

The optical system of the phase detector includes an adjustment (not shown) for the spacing between the slits, and this may be varied from, say, 0 to .015″, and a usual value is 0.005″. Too much precision is not worthwhile because the basic comparison goes back to the original manual registration, which may not be closer than the 0.005″. Also the usual printing is of multiple or repeated impressions on a wide web, perhaps a block of six or eight sheets at a time, and these themselves may differ slightly in spacing as between one gravure cylinder and another, so that the registration is necessarily a compromise as to the positions of all of the different sheets in a single block of sheets. Thus, in Fig. 2a the marker 510 may apply to the four sheets 511, 512, 513, and 514.

Referring now to Fig. 4, the web scanner 170 responds to a change from light to dark on web 60 (or vice versa, by changing a switch provided), and the wave is preamplified and transmitted to the next block 172. In block 172 the wave is amplified and clipped (that is, cutting off the negative part of the wave) and is selected in positive direction to respond only to a signal above a predetermined amount, and triggers the formation of a very sharp pulse which is then the working signal. This signal goes to the advance and retard diodes 174, 176 and thence to the advance and retard thyratrons 178, 180. The amplifier in block 172 may be changed to act as a multivibrator to send out pulses when the web is still.

Pulses also come down from the phase detector and preamplifier in block 182, which pulses are amplified in block 184 and then fed to the thyratrons 178, 180. Two channels are shown, one for the leading slit of the drum, and the other for the lagging slit. For either thyratron to fire it must receive coincident pulses from the web scanner and the phase detector. Thus the latter pulses act as gates. If the coincidence is for one gate the web must be retarded, and if it is for the other gate the web must be advanced, but if the registration is exactly right the web scanner pulse comes at a time between the two gates, and there is no coincidence, and neither thyratron fires, and there is no correction at the motor. The thyratrons when fired operate relays 186, 188, respectively, which control indicator lamps 150 and 152, respectively, and also control the operation of the registration correction motor 74. By suitable switching, schematically indicated at 190, the relays will control the phase motor 132 instead of the correction motor 74.

If scanner pulses occur outside the operating zone of the two slits they are of no effect, which is important because the web 60 may be full of printing other than the used marker. Thus a special or clear marker track is not needed. The extinguishing circuit in block 192 cuts out the thyratron after it has been fired (for otherwise a thyratron remains closed when once fired), and it is adjusted to do so in less than one revolution of the gravure cylinder. It functions as a reset arrangement to permit functioning again for each rotation. If there is still an error the thyratron 178 or 180 may immediately re-ignite, but the relays 186, 188 are slower and will not have cut out at all, but simply remain closed during repeated cylinder revolutions while the error continues. The rapid repetition, which is easily handled electronically in a tube, does not have to be handled mechanically in either an electrical relay for an electric motor, or a solenoid operated hydraulic valve for an hydraulic motor.

The timing circuit in block 194 is optionally useable to make the thyratrons work in pulses instead of continuously, or in other words to reset, when the web is standing still or moving slowly. This prevents overcorrection. The indicator lamps 150, 152 show which way correction is needed. The tolerance control handle shown at 196 adjusts the optical system of the phase detector to, in effect, change the gap between the slits.

Figure 5:
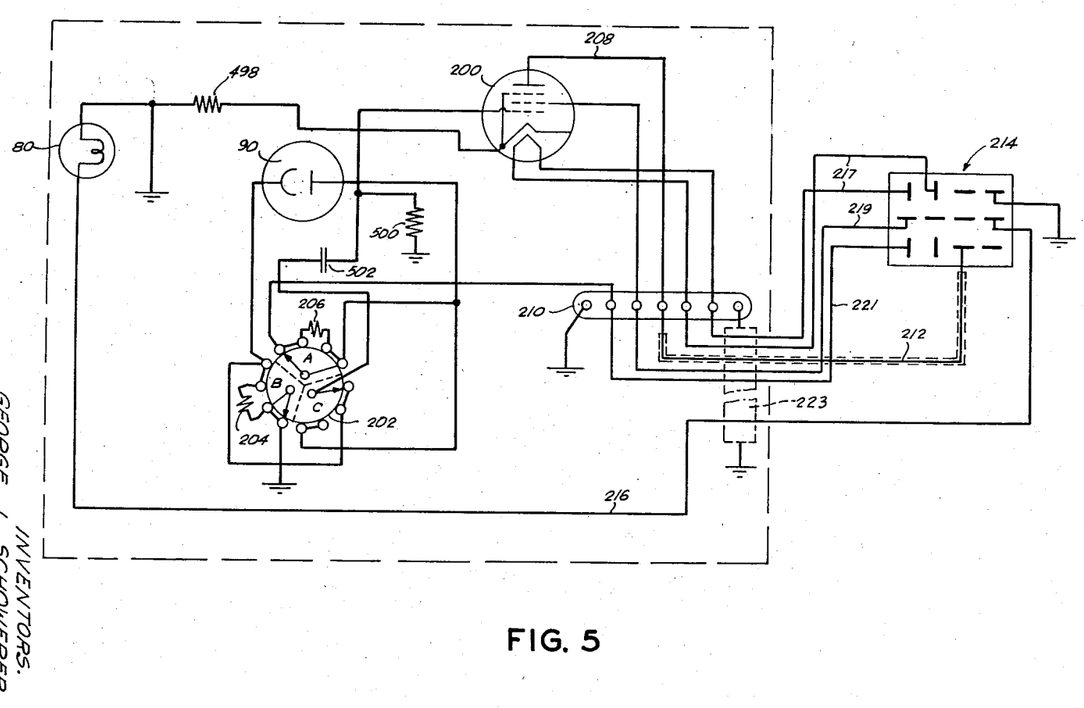
Figs. 5–8 together constitute a detailed wiring diagram for the circuitry of the present invention, Fig. 5 being for the scanner, Fig. 6 the phase detector, Fig. 7 the circuitry located in a box at the press, and Fig. 8 the control panel and remotely controlled motors.
Figure 6:
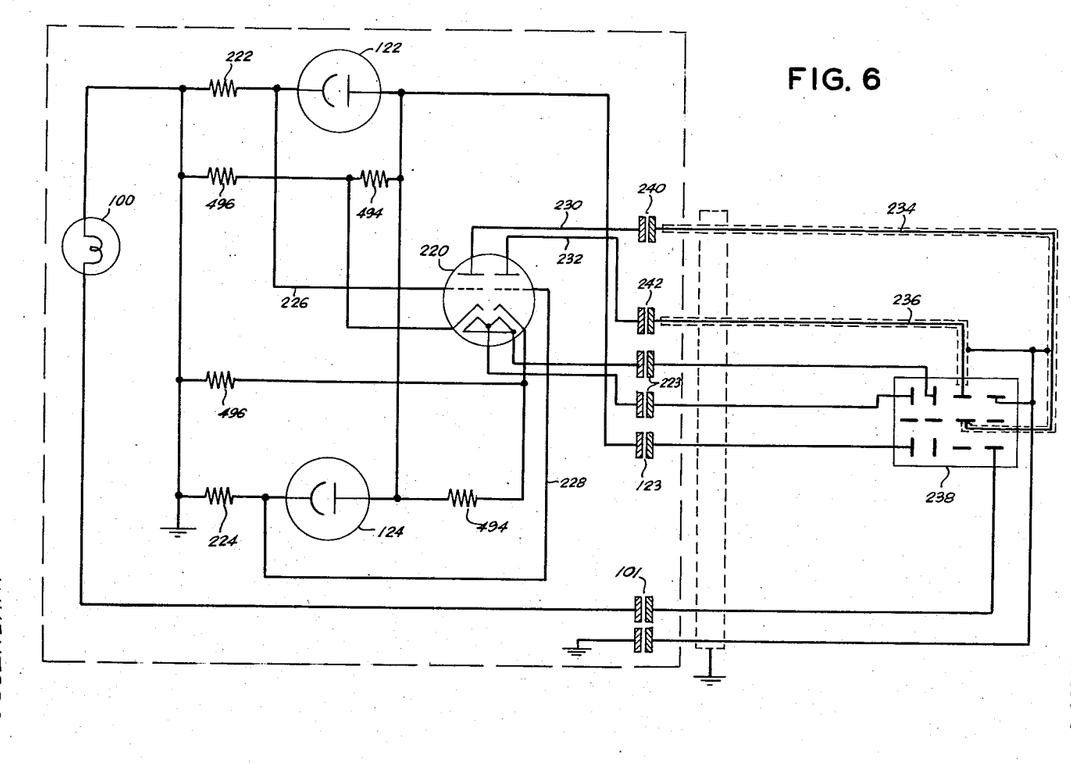

The detailed wiring of the specific form of apparatus here shown is next described with reference to Figs. 5 through 8 of the drawing. These add up to a single complete diagram, which would be too large to place on a single sheet. Certain detachable connectors are used in the actual apparatus, between separated units, for convenience of installation and servicing, and Figs. 5, 6 and 8 show apparatus which is connected to connectors shown in Fig. 7. The latter has a fourth connector 526, but that is merely for certain test or servicing apparatus, not necessary to describe herein.

Fig. 5 shows the web scanner. This includes a light source 80, photo tube 90, and preamplifier tube 200. Source 80 throws a beam of light which is focused by a lens 82 (Fig. 3) and reflected from the web on to the cell 90 when the web is light and not when it is dark. The reflected beam must pass through a lens 86 and a slit 88. A switching unit 202 (Fig. 5) is provided, the purpose of which is to permit the scanner to be used either going from light to dark, or from dark to light, as may be needed by the subject matter being printed. It simply reverses the plate-to-cathode connections, and in effect is a double pole double throw switch. Resistors 204 and 206 are simply the load resistors of the photo tube 90, one being used when the switch is turned one way, and the other when turned the other way. In either case the useful signal going to the preamplifier tube 200 is a negative-going signal. It leaves the tube 200 as a positive-going signal on its anode, which goes by way of conductor 208, terminal strip 210, and shielded conductor 212, to a pin of connector 214. Another pin of connector 214 energizes lamp 80 by way of conductor 216. Conductors 217 lead from connector 214 to heat the filament of tube 200. Conductor 219 leads from connector 214 to one screen of tube 200. Conductor 221 goes to the plate of the photo tube 90 (through the switch 202) and provides positive potential for the photo tube. Rectangle 223 represents a shielded ground conductor to the circuit of Fig. 7.

Referring now to Fig. 6, the lamp of the phase detector is shown at 100. Two photo cells, one for each slit, are marked 122 and 124. 220 is a dual triode used as a preamplifier for the photocell outputs, one-half of the tube being used for each cell. In this case the circuit always functions going from dark to light (from drum to slit). Light increases the current through the photo tube and through the load resistors 222 and 224, and the voltage change is fed in each case to the grids of the preamplifier through the conductors 226, 228.

The amplified output comes from the plate terminals and goes through conductors 230 and 232 to slip rings 240, 242 and thence through shielded conductors 234 and 236 to connector 238. The slip rings are needed because of the full 360° range of adjustment of the barrel. The output of the preamplifier tube 220 is negative-going pulses. Slip ring 101 is for power supply to the lamp 100; slip rings 223 are for the heating filament of the tube 220, and slip ring 123 is for positive potential for both photo tubes 122 and 124.

Figure 7:
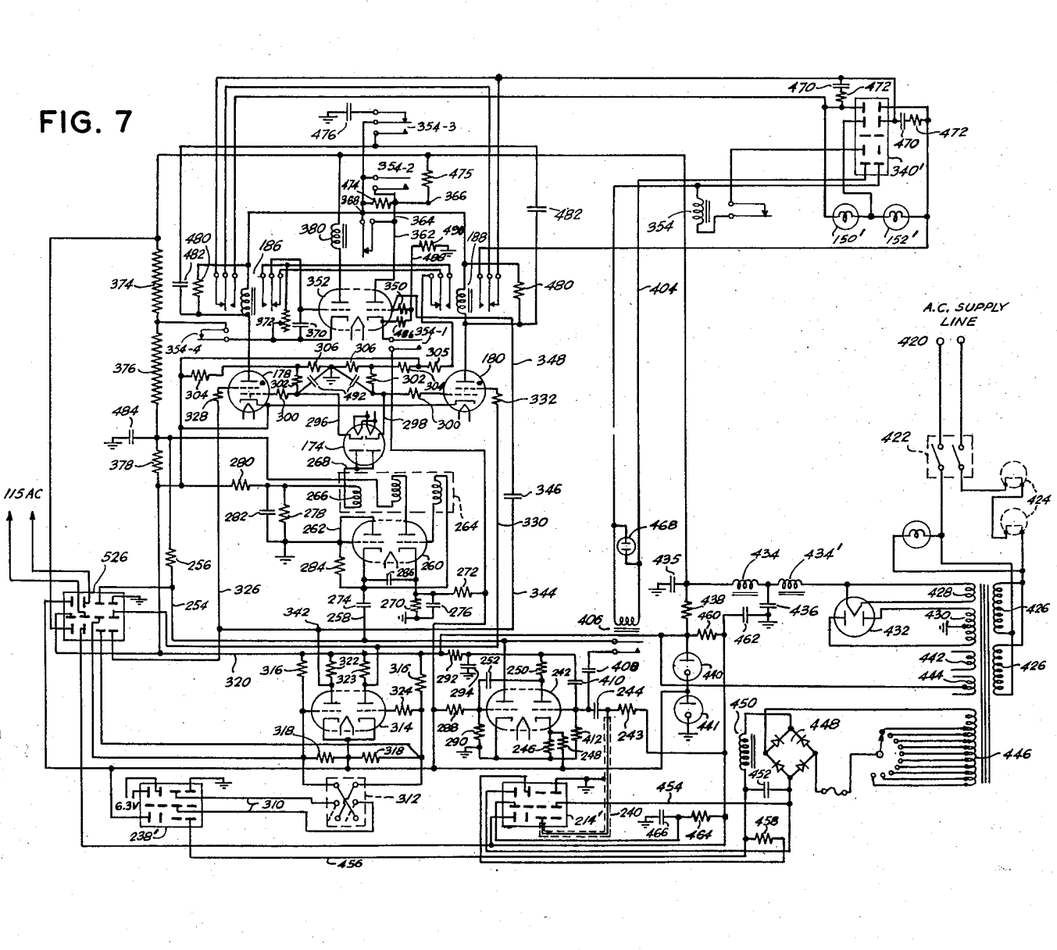
Figure 8:
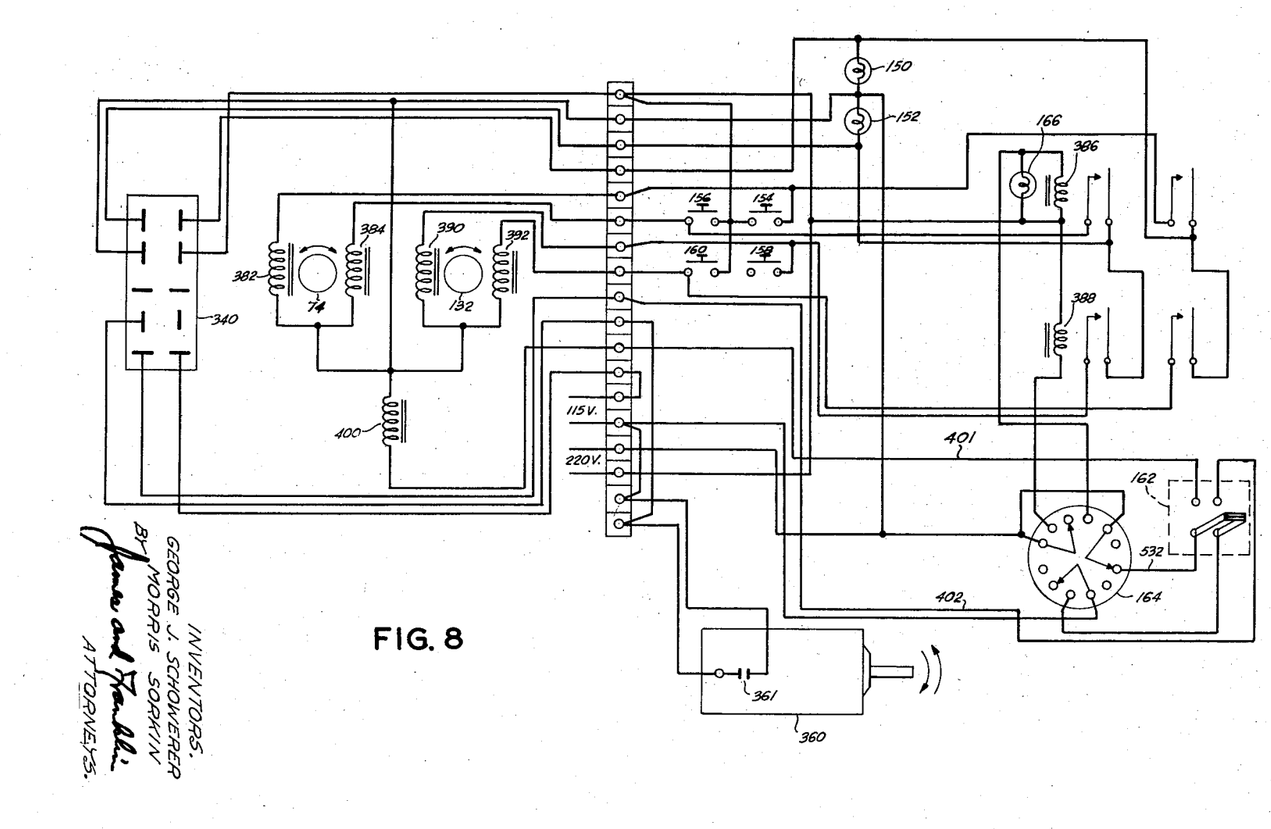

Referring now to the main diagram, Fig. 7, the web scanner receptacle connector is shown at 214', which receives connector 214 of Fig. 5. It delivers the scanning signal through shielded conductor 240, which goes to the grid of dual triode 242 through a coupling condenser 244. Tube 242 (right side) is biased so that it does not respond to negative-going signals at all, and is additionally biased so that it does not respond to positive-going signals unless beyond a desired cutoff point. The bias is established by a cathode resistor 246 and a resistor 248 which feeds current from the positive potential supply through the resistor 246. In the absence of a signal, tube 242 is non-conductive or cut off. This eliminates what is the equivalent of "noise" in sound systems, that is, fluctuations which would result from the passage of any normal web, even an unprinted web. When there is a signal, there is a pulse of current across the output or load resistor 250, which is coupled through condenser 252 to the grid of the left triode of tube 242, which provides a second stage of amplification. (However, as later described, the tube 242 is sometimes used as a multi vibrator instead of as an amplifier.) The left side of tube 242 is run with no bias, and it conducts heavily in the absence of signal, and its plate conducts heavily through conductor 254 and plate load resistor 256, so that the plate is running with a small positive potential in the absence of a signal.

When a signal is received, a negative pulse is applied to the left grid of tube 242, which cuts off the plate current and causes a rise in plate potential. This rise is applied through conductor 258 to the left side of dual driode 260. This tube and associated circuit are a blocking oscillator, that is, a regenerative circuit normally biased to its cutoff so that it does not oscillate. A trigger pulse from amplifier 242 overcomes the bias and tube 260 oscillates, but for only one oscillation.

The left side of tube 260 is used as a diode, the plate and grid being connected together as shown at 262. The tube 260 is used to convert the signal pulse into an exceedingly sharp steep pulse coincident with the leading edge of the signal pulse. The transformer within rectangle 264 is a conventional three-winding transformer. Two windings provide the coupling between grid and plate circuits, and the third winding 266 is an output winding so phased that its output pulse is positive-going at the lower end, as drawn. This feeds through conductor 268 to the plate of the left side of a dual diode 174.

The triggering of a sharp pulse is important not only for accuracy but also because it makes it possible to use an ordinary part of the printed picture or lettering as a marker. No special marker is needed and no clear track is needed. Thus, referring to Fig. 2a, the part 510 may act as a marker even though it is simply the leading edge of the printed panel. The edge used need not be the leading edge of the entire panel, and instead any distinctly printed edge within the body of the panel may equally well be employed. Of course, the edge selected is preferably one disposed perpendicular to the direction of web travel, so that registration will not be affected by any side-to-side movement of the web. Moreover, there is advantage in selecting an area of moderate size rather than one which is excessively short or long. A typical desirable marker area would be one having dark printing for, say, ¼" web travel, followed by contrasting light or unprinted area for, say, ¼" of web travel or more.

Dual diode 174 (Fig. 7) functions as a one-way conductor or check valve between the blocking oscillator 260 and thyratron tubes 178 and 180, one diode leading to thyratron 178 and the other to thyratron 180. Diode 174 affords complete freedom in the circuitry and biasing of the thyratrons, and avoids having the low impedance of the blocking oscillator output affect the thyratron circuits. Without the diode 174 it is possible for the negative-going portion of the blocking oscillator output to extinguish the arc of the thyratrons prematurely.

Resistors 270 and 272 set up the bias or cut-off point for tube 260. Capacitor 274 is a coupling condenser. Capacitor 276 is a bypass for the cathode resistor 270. Resistors 278 and 280 establish a potential on the plates of dual diode 174 to make it non-conductive in the absence of a pulse. Condenser 282 is a bypass for resistor 278. The resistor 284 and condenser 286 are parts of the blocking oscillator centering about tube 260.

Going back briefly to tube 242, the resistors 288 and 290 put a small positive bias on the grid of the left side of the tube to make it conduct heavily in the absence of a pulse. Resistor 292 and condenser 294 together act as a filter to help eliminate ripple or noise.

Dual diode 174 is connected to the thyratrons 178 and 180. The connection is from the cathode of the diode and conductor 296 to the lower grid of tube 178, and conductor 298 to the lower grid of tube 180. The resistors 300 are protective resistors connected in series to limit the grid current. Resistors 302 are the grid resistors. Resistors 304 and 306 set the bias on the grid of the thyratron so that the thyratron is cut off in the absence of pulses, and it also sets the cathode potential of the diode to help keep it non-conducting in the absence of pulses. The upper grids of the thyratrons are also biased to keep the tubes non-conducting in the absence of pulses. These latter grids receive the phase detector or gate pulses, and it is at these grids that the coincidence of scanner and gate pulses is manifested.

The connections from the phase detector are brought into the receptacle or connector 238' which receives connector 238 of Fig. 6. The two displaced pulses are brought into two pins, as previously described in connection with Fig. 6. The pulses first go through conductors 310 to a double pole double throw reversing switch 312, which allows for the fact that a printing press might be run in reverse direction, thus changing the slit sequence. The pulses then go to tube 314, which is a dual triode, one side being used for each gate. The tube 314 is heavily conducting under bias created by four resistors 316 and 318. The pulse comes in negative, and cuts off the heavy current, and so raises the plate potential to the potential of the supply (in this case 180 v.) at conductor 320, which is also the potential at which the cathode of thyratrons 178 and 180 are set. Resistors 322 and 323 are the load resistors of the tube 314. Resistors 324 working together with the capacitance of the tube helps equalize the time constant of the leading edge of the second gate, to better match that of the trailing edge of the first gate.

There are now positive-going pulses connected from left side of the tube 314 through conductor 326 and resistor 328 to the upper grid of thyratron 178, and from the right side of the tube 314 through conductor 330 and resistor 332 to the upper grid of thyratron 180. Resistors 328 and 332 serve to inhibit premature extinction of a fired thyratron when the pulse ends.

To summarize a little at this point, there is a single scanning pulse coming up through common line 268 of dual diode 174 and going to the thyratron lower grids through the said diode 174, and there are phase detector or gate pulses which are sequential and which come up separately to the upper grids of the thyratrons 178, 180. The scanner pulse may come in the dead zone, in which case the thyratrons do not fire, or it may be coincident with one or the other gate pulse, in which case one thyratron or the other fires, or it may come outside the operating zone (there being much printing on the sheet other than the marker, outside the operating zone) in which case the thyratrons do not fire.

Greatest accuracy is obtained by the coincidence of a sharp pulse. Such is the case here, with the scanning pulse only a few microseconds in length. The reason a blocking oscillator is used for the scanning pulse and not for the gate pulses is that the marker may be of indeterminate length, and is scanned under variable conditions as to light intensity, etc., whereas in the phase detector ideal conditions are set up, with sharply outlined slits, and high light intensity and amplification and biasing such that a sharp pulse is obtained, at least in terms of a sharp leading edge and lagging edge, which is all that is needed for this purpose. Also the gate pulse duration is accurately proportionate to a given fraction of a revolution, even though not necessarily an exceedingly short pulse, as when the press is moving slowly.

Relay coils 186 and 188 are connected in the plate circuits of the thyratrons 178, 180, and one or the other is energized when its thyratron fires. The relay contacts drawn on the outside of the coils are for the indicator lamps and the motors. The relay contacts inside the coils are a part of a timing circuit, to be described later.

Of the three conductors outside the coils, one acts as an interlock to the opposite relay to make sure that the motor cannot be connected to run both ways at once. It is a precaution against both thyratrons firing and both relays closing simultaneously. A pair of red and green indicator lamps are shown at 150' and 152', these being localized on the housing at the press unit. They work in unison with lamps 150 and 152 on the control panel 40 in Fig. 2. The connections to the motors and control panel are through the connector 340'.

As so far described a thyratron would remain lit when once fired, and it must be extinguished. One kind of extinction is at the end of a machine revolution, to reset everything preparatory to a new phase detection. This may be obtained as follows: The leading gate coming from left side of tube 314 goes through junction 342, conductor 344, condenser 346, and conductor 348, which with resistor 350, acts as a differentiating circuit to produce a pip corresponding to the leading edge of the leading gate. The pip is fed to the grid of the right side of tube 352. There is a relay 354 which is controlled from the main switchboard. Relay 354 has a series of sets of contacts (354–1, 354–2, etc.), with no attempt being made on the drawing to locate them on the diagram near the coil of relay 354. Assume the contacts are down.

The pip at the beginning of the next gate after a revolution, on reaching the grid of righthand tube 352, causes the tube to draw heavy plate current, and drops the voltage at the plate of the tube, which through conductors 362, 364, drops the voltage at junction 366, and thence at relay contacts 354–2 (assumed down, as is true also of contacts 354–3, these all being worked by the same relay coil 354 previously mentioned). In the down position contacts 354–2 connect junction 366 to junction 368 and thence to the relay coils 186 and 188. Inasmuch as the relay coils are connected directly to the thyratron plates, the thyratron plate voltages are dropped so low as to extinguish a conductive thyratron.

As so far described a normal or high press speed is assumed, so that the correction is in small increments, with a recheck of whether a correction is needed after every revolution. Suppose, however, the press is crawling very slowly, or even is stopped. The correction would be excessive because the correction motor would be running continuously. In the present case what is done is to use a centrifugal switch which responds to slow speed and changes the circuit so that the thyratrons are extinguished on a time elapsed basis, instead of on a one-revolution basis. Switch 360 (Fig. 8) controls the coil of relay 354 shown in Fig. 7, which in turn controls the contacts 354–1 previously referred to as being in down position, meaning at normal (high) press speed.

When centrifugal switch 360 of Fig. 8 changes at slow speed, relay 354 (Fig. 7) changes to the up position shown in the drawing, instead of the down position previously supposed, and that brings into operation a timing circuit using the lefthand side of tube 352 and an RC circuit consisting of a condenser 370 and a resistor 372 and relay contacts on the inner side of relays 186, 188.

First suppose that the thyratrons have not yet fired. The left side of tube 352 is normally cut off, it having a negative bias on the grid produced through the innermost relay connections and the resistor 305, and having a cathode connection through relay contacts 354–4 to the main voltage divider 374, 376, 378 of the general power supply. Suppose now the thyratron has fired. The inner relay contacts close outwardly (instead of inwardly as shown) and allow the capacitor 370 to discharge through adjustable resistor 372. Then the left side of tube 352 draws current and energizes relay 380, opening its adjacent contacts. This breaks the connection to junction 368, and consequently breaks the supply to the thyratron plates through the relay coils, and so extinguishes the thyratrons. The timing is measured by the time needed for the charge of condenser 370 to fall off to the point where the left side of tube 352 conducts. There will be one increment of correction during this time, and no further correction until at least one revolution later when continued correction may be called for. Of course, if no further correction is needed there may be no thyratron firing for many revolutions.

Referring now to Fig. 8, the motor for registration control is indicated at 74. As here shown it is an hydraulic motor, but its control is electrical because it is controlled by solenoid operated valves. The hydraulic motor is reversible and is run in either direction by using two supply valves, one or the other of which is open, or neither. The solenoids for the valves are shown at 382 and 384. The upper pins of connector 340' shown in Fig. 7 go in to the upper pins of connector 340 shown in Fig. 8. The lamps 150, 152 in Fig. 8 are on the master panel board (the top two rows of lamps in Fig. 2). The manual control buttons for registration are shown at 154, 156. The manual control buttons for phase adjustment are shown at 158, 160. The toggle switch for coarse or fine adjustment is shown at 162. The three position switch for manual or automatic phase adjustment or automatic cylinder registration is shown at 164.

To facilitate the switching operation it is found useful to interpose relays in the circuitry on the main panel board, and the relay for the register motor control is shown at 386. Note that the lamps 150, 152 work for either registration or phasing, but there is a separate set of buttons 158, 160 for phasing, and another relay 388 for phasing, the solenoid coils for the hydraulic phasing motor 132 being shown at 390 and 392.

The lamp 166 is a pilot lamp to indicate that automatic register is in effect (the normal operation of the equipment). In the condition shown, with the contacts of relay 386 to the right or open, there is manual register control. The only thing responsive to the scanner and phase detector are the lamps 150, 152. One set of lamps 150, 152 is adequate, recognizing that their indication is a relationship between registration and phasing. Otherwise the control is entirely manual, the three-position switch 164 being set in the manual position. At this time relay coils 386 and 388 are de-energized. Operating buttons 154, 156 will run register motor 74 in either direction. The manual position on the three-position switch 164 sets up for manual operation of everything.

Assume next that switch 164 is moved to the automatic register position. This change energizes relay coil 386 and shifts its contacts to the left and so connects the solenoids 382 and 384 to the lamp circuit.

If now switch 164 is moved to the phasing position the relay 386 is de-energized and relay 388 is energized, thus moving its contacts to the left or closing them, and this applies the solenoids 390 and 392 to the lamp circuits, in order to operate the phasing motor 132, instead of the register motor 74.

The first or manual part of the phasing control is done with switch 162 in coarse or closed position. At that time a special "coarse-fine" solenoid 400 is energized through conductor 401 and opens a valve feeding the phasing motor to operate it at maximum speed. When the switch 162 is in the opposite or open position the solenoid 400 is deenergized and the valve is partially closed to operate motor 132 at greatly reduced speed. When three-position switch 164 is in the phasing position a third circuit part of the switch works through conductor 402 going to the lower left terminal of connector 340, and then, in Fig. 7, the corresponding lower left terminal of connector 340' through conductor 404 to the coil of a relay 406, thereby closing its contact. This relay is normally open and is closed only when phasing. This happens only if switch 162 is in coarse position, and it is for this reason that switch 162 has its righthand pole.

In Fig. 7 the closing of relay 406 starts the production of a series of pulses to be used in standstill phasing. For this purpose tube 242 is now employed as a multi vibrator tube, and feedback is added through condenser 408, which becomes connected between the grid of the righthand tube to the plate of the lefthand tube. Inasmuch as these are two stages in cascade, a regenerative circuit is established. Condenser 410 is always in circuit and provides a slight amount of feedback to sharpen up the amplification and the pulse. The resulting oscillator is a relaxation or resistance type oscillator, commonly called a multi vibrator. It is a regenerative circuit in which the oscillation produced may be very slow (say six or eight times a second here) instead of at high frequency, and it depends on the build-up and decay of voltage on an RC circuit. In the present case the RC circuit comprises resistors 246 and 412 and capacitors 408 and 410.

The power supply circuit is shown in Fig. 7. Power input is at terminals 420, and goes to line switch 422, and thence through ballast tubes or voltage regulating tubes 424 to a transformer primary 426. This is shown divided so it can be used at 115 or 230 v. (connected in parallel or in series). There is a low voltage secondary 428 for the rectifier tube filament. There is a high voltage secondary 430 for "B" supply leading to the rectifier 432. The "B" supply is filtered by inductors 434 and condensers 435, 436. Resistor 438, together with the remote voltage divider 374, 376, 378 and voltage regulator tubes 440, 441, provide the various high D.C. operating voltages for the tubes. Transformer secondary coils 442 and 444 are additional filament secondaries.

As a refinement it is desirable to use D.C. rather than A.C. on the lamps in the scanner and phase detector. This is provided by secondary 446 cooperating with selenium rectifier 448 and a filter consisting of choke 450 and capacitor 452. The connections for the lamps are through conductor 454 to connector 214' and through conductor 456 to connector 238', with the two lamps connected in series. Resistor 458 supplies the filament of the preamplifier in the scanner. Here again it is preferable to use the refinement of a special D.C. source, instead of simply putting raw A.C. on the filament.

The RC combination 460, 462 (Fig. 7) acts as a filter for the "B" supply for photo tube 90 (Fig. 5). The RC combination 464, 466 (Fig. 7) acts as a filter for the supply to the screen of the preamplifier tube 200 in Fig. 5. Note that these RC filters follow and supplement the main filter 434, 435, 436, thus making a better filter supply for the scanner. The refinements for the scanner have not all been put into the phase detector because there is a much stronger signal in the phase detector and a bigger output without as much amplification, so that some disturbance can be tolerated.

The neon lamp 468 is located at the printer and shows when standstill phasing is going on.

Spark suppressors 470, 472 are associated with relay contacts to reduce arcing. Resistor 474 at relay contacts 354–2 also helps prevent arcing. It is of too high a value to permit maintaining thyratron fire.

The upper contacts 354–3 of relay 354 either puts in or takes out capacitor 476 in circuit. The purpose is to prevent high voltage discharges resulting from the relay operation from feeding back to earlier parts of the circuit when the RC timing circuit is being used to extinguish the thyratrons.

Shunt resistors 480 at relays 186, 188 are across the relay coils to reduce inductive kick. Condensers 482 are used for the same reason. Condenser 484 is a part of the "B" supply filter associated with the voltage divider.

Resistor 486 connected by conductor 488 to resistor 490 forms a voltage divider which sets the bias applied to the righthand grid of tube 352 to keep it normally cut off. Condensers 492 of the thyratrons have a switch effect to facilitate firing of the thyratrons when conditions call for firing.

In Fig. 6 resistors 494 and resistors 496 set the initial bias on tube 220 to cut off.

In Fig. 5 resistor 498 is a cathode resistor for preamplifier tube 200. Resistor 500 is a grid resistor for the same tube. Capacitor 502 is a coupling capacitor between the photo tube 90 and the preamplifier tube 200.

As an example of quantitative values of components used in the circuit, the following may be given:

Referring to Fig. 5, the lamp 80 is a #1323 light source. The photo tube 90 is a Type 929. The tube 200 is a Type 9001. The switch 202 is a Mallory switch #3234J. Resistor 498 is 600 ohms. Resistor 500 is 10 megohms.

Referring now to Fig. 6, the lamp 100 is a #1323 light source. The photo tubes 122 and 124 are Type 922. The tube 220 is a Type 6SL7GT. Resistors 222 and 224 are 3.3 megohms. Resistors 494 are each 33,000 ohms.

Referring now to Fig. 7, the tubes 242 and 314 are Type 6SL7G2. The tubes 260 and 352 are Type 6SN7G2. The tube 174 is Type 6ALS. The tubes 178 and 180 are Type 2050 or 2051. The tube 432 is a Type 5Y3GT. Tube 440 is Type VR105, and tube 441 is Type VR75.

In the circuitry centering on tube 242, resistor 246 is 900 ohms. Resistor 248 is 27K (meaning 27,000 ohms). Resistor 250 is 100K. Resistors 288 and 290 are each 1 meg. (one million ohms). Resistor 243 is 100K. Resistor 292 is 10K. Capacitors 244 and 252 are each 0.25 mfd. Capacitor 410 is 4.7 mmf. Capacitor 408 is 500 mmf. Capacitor 294 is 4 mfd.

In the circuitry surrounding tube 314, resistors 318 and resistor 323 are each 100K. Resistor 322 is 50K. Resistors 316 are each 560K. Resistor 324 is 1 meg.

In the circuitry centering on tube 260, resistor 270 is 10K; resistor 272 is 27K; resistors 278 and 280 are each 18K. Resistor 284 is 1 meg. Resistor 256 is 27K. Capacitor 274 is 0.005 mfd. Capacitor 276 is 0.25 mfd. Capacitor 282 is 0.1 mfd. Capacitor 346 is 100 mmf.

In the circuitry centering about the tubes 178 and 180, resistors 300 are each 10K; resistors 302 are each 1 meg.; resistors 304 are each 27K; resistor 305 is 10K; and resistors 328 and 332 are each 1 meg. Capacitors 492 are each 51 mmf.

In the circuitry at tube 352 the resistor 350 is 1 meg.; resistor 486 is 100K; resistor 372 is 200K; resistor 490 is 240K; resistors 480 are each 50K; resistor 474 is 10 meg.; and resistor 475 is 10K. Capacitor 370 is 0.25 mfd.; capacitor 476 is 0.05 mfd.; and capacitors 482 are each 0.1 mfd.

In the voltage divider, resistor 374 is 10K; resistor 376 is 2K; resistor 378 is 2K; and capacitor 484 is 20 mfd.

In the spark suppressors at connector 340' capacitors 470 are each 0.1 mfd., and resistors 472 are each 100 ohms.

In the power supply the inductor 434 is 22 henries at 35 milliamperes D.C., and inductor 434' is 15 henries at zero current and 5 henries at 90 milliamperes D.C. Choke 450 for the light source is 50 henries at 4.5 milliamperes. The resistor 438 is 5K; resistor 460 is 27K; capacitor 435 is 10 mfd.; capacitor 436 is 20 mfd.; capacitor 462 is 10 mfd.; resistor 464 is 240K; capacitor 466 is 4 mfd.; capacitor 452 is 2,000 mfd.; and resistor 458 is 34 ohms.

It will be understood that the foregoing quantitative values have been given solely by way of exemplification, and are not intended to be in limitation of the invention.

Referring now to Fig. 8 of the drawing, the motor 74 is an hydraulic motor which is reversible and which is controlled by solenoid operated valves. The motor 132 is an hydraulic motor which is reversing, and controlled by solenoid operated valves, and additionaly controlled by a solenoid valve 400 for fast or slow operation. The switch 360 is a centrifugal switch commercially sold under the name "Euclid."

Figure 9:
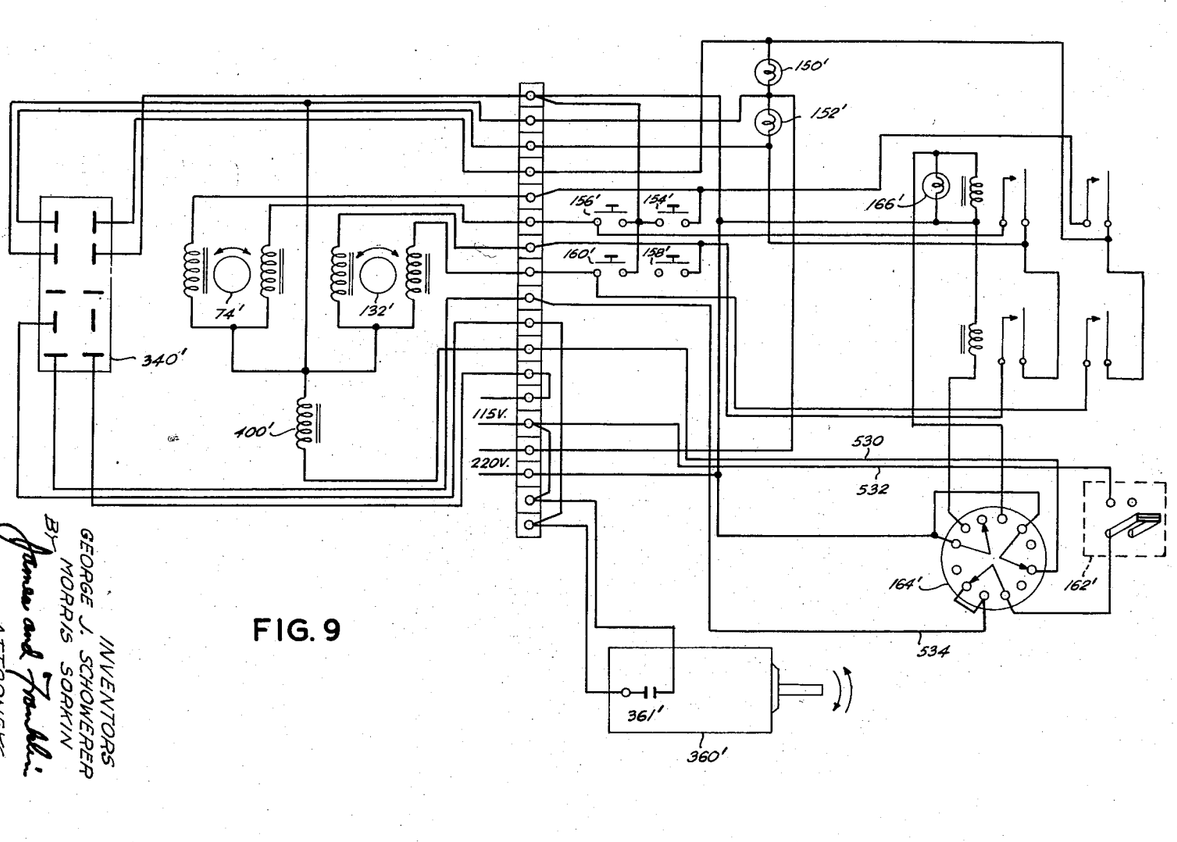
Fig. 9 shows a modification of Fig. 8.

A slight modification of the wiring shown in Fig. 8 may be employed, which is shown in Fig. 9. In Fig. 8 the switch is used to control solenoid valve 400 which determines whether the phasing motor 132 operates at high speed or low speed. In Fig. 9 the wire 530 for this purpose is connected into the selector switch, and the phasing motor is operated at high speed whenever the selector switch 164' is put in mid-position or "Manual." When the toggle switch 162' is open, the tube 242 of Fig. 7 does not operate as a multi vibrator. When the toggle switch 162' is closed it connects the 115 v. supply through conductor 532 and switch 162' to the selector switch and thence through conductor 534 to the connector 340' in Fig. 7. It leads to relay 406 in Fig. 7, which causes tube 242 to act as a multi vibrator.

In the arrangement of Fig. 8 both rough phasing and fine phasing are preferably done with the web standing still, for the multi-vibrator operates during phasing, and with the web in motion there would be conflict between the marker pulses and the multi vibrator pulses. However, with the arrangement of Fig. 9, fine phasing may be performed with the web in motion, and indeed it may be performed first with the web standing still, and then additionally with the web in motion. With the web standing still the switch 162' is in closed position with the multi vibrator operating, and when the web is put in motion the switch 162' is put in open position to stop the multi vibrator.

In making ready the press is run and the units are registered manually with the selector switches 164' in "Manual" and by using the register buttons 154', 156'. The press is then stopped and the web jogged at one unit to bring a marker beneath the web scanner light beam. The switch 162' of that unit is used to operate the multi vibrator, and the phasing buttons 158', 160' of that unit are used to bring the phase detector to the operating zone, as indicated by flashing of red or green lamp 150' or 152'. The selector switch 164' is then changed from manual to phasing position, whereupon automatic phasing proceeds until the lamp is extinguished, at which time the multi vibrator switch 162' is moved to off position and the selector switch is moved back to manual position. This operation is repeated for each press unit, the web first being jogged to bring a marker beneath the scanner light beam at each press unit being phased.

When this has been done for all of the presses the web is set in motion and the selector switches are turned to phasing position, which will automatically additionally adjust the phase selectors, but this time with the web in motion, and with the pulses produced by the scanner instead of by the multi vibrator. As the flashing lights extinguish, the subjacent selector switches are moved from phasing position to register position (and the adjacent pilot light 166' goes on). When all selector switches have been put in "Register" position the press is in production. If a color is seen to be off register and manual correction is desired, the phasing buttons rather than the register buttons are used, for reasons explained below.

It is believed that the construction and operation of the improved registration control apparatus, as well as the advantages thereof, will be apparent from the foregoing detailed description.

In setting up initially, the gravure cylinders are first set roughly at the splines; then there is manual registration, with the operator looking at the web and using buttons 154, 156 to control the motor 74, then there is rough phasing of the barrels. For this purpose a switch change affecting box 172 (Fig. 4) causes it to act regeneratively as a multi vibrator which sends out pulses, and these pulses feed through the circuits as though the web were moving at high speed with markers passing the scanner. Instead, however, the web is standing still with the marker stationary in front of the scanner as near as can be judged by the operator. The pushbuttons 158, 160 for the phase motor 132 are used to turn the phase detector barrel until the operating zone is reached, as indicated by flashing of the lamps 150, 152.

After this rough phasing the next step is fine phasing, which is done automatically by throwing switches to connect the phase motor 132 instead of the correction motor 74 to the relays. This positions the barrels in the "dead" zone, which is the zone between the two slits. This may be done with the web still, or moving, or first still and then moving.

The pushbuttons retain control over the motors at all times. This permits intervention of the operator. If the operator sees that a particular color is off register, and wishes to correct it by manual or pushbutton control, he should use the phase buttons rather than the register buttons. The register buttons would successfully cause a momentary change, but on release of the button the phase detector would promptly seek to pull the unit back into the previous error, whereas if the change is made at the phase detector the change will be permanent instead of temporary.

As a corollary, it will be seen that during automatic phasing with the web travelling, if the operator sees a color off registration, he should correct it by using one of the register buttons. This will change the registration, and the automatic phase adjustment then going on will fall into step and will follow the change. Then the switches are changed to establish automatic registration or re-use of correction motor 74.

The apparatus may be used with webs travelling at high speed, say 1,500 feet per minute. Web variations caused by humidity, temperature, tension, acceleration, deceleration, etc., are automatically compensated to hairline accuracy. The invention is applicable to multi-color printing units, or other units working on a web, such as presses for perforating, scoring, punching or cut off. The marker on the web does not require a clear track, and indeed no special marker is needed. Any part of a block or printing or illustration may be used to trigger the sharp pulse, although it is preferred that the print edge used be perpendicular to the web in order to be independent of side-to-side registration.

Because the phase detector is photo electric it is not subject to wear, and it is independent of web speed. The phase detectors may be roughly phased with the web at standstill, thus avoiding great waste of stock. The speeded up motor and convenient circuitry and signal lamps make it possible to perform the rough standstill phasing with great rapidity, thereby minimizing the time during which the web is kept at standstill. The more accurate or fine phasing of the phase detectors is produced automatically with the web in motion and with all units being phase simultaneously, yet independently of one another.

The pulses delivered by the phase detector may be made accurate and precise because of the controlled ideal optical conditions used. The scanner pulse which is obtained under more difficult and variable conditions is nevertheless made extremely accurate because one edge only of the pulse is used to trigger an exceedingly short pulse only, say, two microseconds duration. In the operation of the compensating or register control motor there is a choice of either a relatively continuous correction, dependent on web speed, or pulsing correction, which is independent of web speed, and the selection is preferably made automatically under control of a centrifugal switch, thereby eliminating overcorrection in the event that the web is slowed or stopped. The circuitry designed for register control is itself used for phasing control without necessitating duplicate circuitry, and the centrifugal switch control previously referred to is therefore automatically applied to either register or phase correction. The circuitry is such that the correction motors may be either hydraulic or electrical.

The latter may be an impulse motor with dynamic braking and explosion-proof control. The former is also explosion-proof. In either case the correction motor, particularly for phase correction, may be arranged to operate at high speed for rough phasing, as well as at low speed for fine adjustment.

It will be understood that while the invention has been described in a preferred form, changes may be made in the structure and circuitry disclosed, without departing from the scope of the invention, as sought to be defined in the following claims.

We claim:

1. A registration system including a scanner circuit responsive to a marker on a moving web, means triggered by one edge only of said marker to produce an exceedingly short pulse having a duration of only a few microseconds, in order to improve the accuracy of the registration system the duration of said short pulse being independent of the size of the marker, the said means triggered to produce the desired exceedingly short pulse including a blocking oscillator circuit.

2. A registration system including a scanner circuit responsive to a marker on a moving web, means triggered by one edge only of said marker to produce an exceedingly short pulse having a duration of only a few microseconds, in order to improve the accuracy of the registration system, the said triggered means for producing the pulse being a vacuum tube blocking oscillator circuit.

3. Register control apparatus for maintaining the registration of a rotating element relative to a travelling web having markers, said apparatus comprising a reversible motor controlled by relays which in turn are controlled by thyratrons having grids, a phase detector connected to the rotating element for providing leading and lagging pulses with a dead zone therebetween, means to feed the leading pulses to a grid of one thyratron, means to feed the lagging pulses to a grid of the other thyratron, scanning means to produce pulses in response to the markers on the web, means triggered by one end only of said scanner pulses to produce an exceedingly short pulse having a duration of only a few microseconds, the duration of said short pulse being independent of the size of the markers on the web, means to apply said short pulse to a grid in each of the two thyratrons, and means so biasing each thyratron as to fire only upon receiving coincident pulses, the said means triggered to produce the desired exceedingly short pulse including a blocking oscillator circuit.

4. In the setting up of a registration system using a scanner for scanning markers on a moving web and using a phase detector for rotation with a machine operating on the web, the method of phasing which includes first bringing the machine into register with the web, inching the web to bring a marker to the scanner and then stopping the web, and thereupon turning the phase detector to bring it into approximate phase while the web is at a standstill.

5. In the setting up of a registration system using a scanner for scanning markers on a moving web and using a phase detector for rotation with a machine operating on the web, the method of phasing which includes first bringing the machine into register with the web, inching the web to bring a marker to the scanner and then stopping the web, thereupon turning the phase detector to bring it into approximate phase, thereafter again moving the web and further adjusting the phase detector more precisely to show registration.

6. Register control apparatus for maintaining the registration of a rotating element relative to a travelling web having markers, said apparatus comprising a scanner for scanning the markers on the web, a phase detector driven by said rotating element, manually controllable means for advancing or retarding the rotating element to bring the machine into register with the web, means whereby the web may be stopped with a marker at the scanner for standstill phasing, and means operable at either high or low speed, the high speed operation serving to facilitate quick turning of the phase detector relative to the rotating element to bring it to its operating zone or rough phasing.

7. Register control apparatus for maintaining the registration of a rotating element relative to a travelling web having markers, said apparatus comprising a scanner for scanning the markers on the web, a phase detector driven by said rotating element, manually controllable means for advancing or retarding the rotating element to bring the machine into register with the web, means whereby the web may be stopped with a marker at the scanner for standstill phasing, and means to facilitate quick turning of the phase detector relative to the rotating element to bring it to its operating zone for rough phasing, said means including a motor operable at either high or low speed, and means to cause high speed operation for rough phasing.

8. Register control apparatus for maintaining the registration of a rotating element relative to a traveling web having markers, said apparatus comprising a scanner for scanning the markers on the web, a phase detector driven by said rotating element, manually controllable means for advancing or retarding the rotating element to bring the machine into register with the web, means whereby the web may be stopped with a marker at the scanner for standstill phasing, and means operable at either high or low speed, the high speed operation serving to facilitate quick turning of the phase detector relative to the rotating element to bring it to its operating zone for rough phasing, said means including indicator lights and circuitry to energize said lights when the phase detector has reached its operating zone.

9. Register control apparatus for maintaining the registration of a rotating element relative to a travelling web having markers, said apparatus comprising a scanner for scanning the markers on the web, a phase detector driven by said rotating element, manually controllable means for advancing or retarding the rotating element to bring the machine into register with the web, means whereby the web may be stopped with a marker at the scanner for standstill phasing, and means to facilitate quick turning of the phase detector relative to the rotating element to bring it to its operating zone or rough phasing, said means including a motor operable at either high or low speed, and means to cause high speed operation for rough phasing, and said means including indicator lights and circuitry to energize said lights when the phase detector has reached its operating zone.

10. Register control apparatus for maintaining the registration of a rotating element relative to a travelling web having markers, said apparatus comprising a scanner for scanning the markers on the web, a phase detector driven by said rotating element, a reversible register motor and a running register for advancing or retarding the rotating element, a reversible phasing motor for turning the phase detector relative to the rotating element, and circuitry jointly controlled by said scanner and phase detector for automatically controlling either the register motor or the phasing motor, the former adjusting the rotating element in relation to the markers and phase detector, and the latter adjusting the phase detector in relation to the markers and rotating element.

11. Register control apparatus for maintaining the registration of a rotating element relative to a travelling web having markers, said apparatus comprising a scanner for scanning the markers on the web, a phase detector driven by said rotating element, a reversible motor and a running register for advancing or retarding the rotating element to bring the machine into register with the web, circuitry jointly controlled by said scanner and phase detector for automatically controlling said register motor to maintain registration during normal operation of the apparatus, a reversible motor for turning the phase detector relative to the rotating element when initially setting up the apparatus, and circuitry including switches whereby the joint control of the scanner and phase detector may be applied to the phasing motor instead of the register motor for more precise adjustment of the phase detector.

12. Register control apparatus for maintaining the registration of a rotating element relative to a travelling web having markers, said apparatus comprising a scanner for scanning the markers on the web, a phase detector driven by said rotating element, a reversible motor and a running register for advancing or retarding the rotating element to bring the machine into register with the web, circuitry jointly controlled by said scanner and phase detector for automatically controlling said register motor to maintain registration during normal operation of the apparatus, a reversible motor for turning the phase detector relative to the rotating element when initially setting up the apparatus, circuitry including switches whereby the joint control of the scanner and phase detector may be applied to the phasing motor instead of the register motor for more precise adjustment of the phase detector, and means for generating a series of pulses, said means being set into operation by the aforesaid switches so that the pulses are supplied when the web is standing still thereby replacing the effect of the markers when the web is moving.

13. Register control apparatus for maintaining the registration of a rotating element relative to a travelling web having markers, said apparatus comprising a scanner for scanning the markers on the web, a phase detector driven by said rotating element, a reversible motor and a running register for advancing or retarding the rotating element to bring the machine into register with the web, manually operable switches for controlling said motor, circuitry jointly controlled by said scanner and phase detector for automatically controlling said register motor to maintain registration during normal operation of the apparatus, means whereby the web may be stopped with a marker at the scanner for standstill phasing when initially setting up the apparatus, a reversible motor for turning the phase detector relative to the rotating element, manually operable switches for controlling said motor to bring it to its operating zone or rough phasing, and circuitry including switches whereby the joint control of the scanner and phase detector may be applied to the phasing motor instead of the register motor for more precise adjustment of the phase detector.

14. Register control apparatus for maintaining the registration of a rotating element relative to a travelling web having markers, said apparatus comprising a scanner for scanning the markers on the web, a phase detector driven by said rotating element, a reversible motor and a running register for advancing or retarding the rotating element to bring the machine into register with the web, manually operable switches for controlling said motor, circuitry jointly controlled by said scanner and phase detector for automatically controlling said register motor to maintain registration during normal operation of the apparatus, means whereby the web may be stopped with a marker at the scanner for standstill phasing when initially setting up the apparatus, a reversible motor for turning the phase detector relative to the rotating element, manually operable switches for controlling said motor to bring it to its operating zone or rough phasing, circuitry including switches whereby the joint control of the scanner and phase detector may be applied to the phasing motor instead of the register motor for more precise adjustment of the phase detector, and means for generating a series of pulses, said means being set into operation by the aforesaid switches so that the pulses are supplied when the web is standing still thereby replacing the effect of the markers when the web is moving.

15. Register control apparatus for maintaining the registration of a rotating element relative to a travelling web having markers, said apparatus comprising a reversible motor and differently colored signal lamps controlled by circuitry including thyratron tubes, circuitry for extinguishing the thyratrons in either of two ways, a part of said circuitry serving to extinguish the thyratrons near the end of one revolution of the rotatable element, another part of said circuitry extinguishing the thyratrons at the end of a predetermined time independently of rotation of the element, and switch means to make either part of the circuitry operable.

16. Register control apparatus for maintaining the registration of a rotating element relative to a travelling web having markers, said apparatus comprising a reversible motor and differently colored signal lamps controlled by circuitry including thyratron tubes, circuitry for extinguishing the thyratrons in either of two ways, a part of said circuitry serving to extinguish the thyratrons near the end of one revolution of the rotatable element, another part of said circuitry extinguishing the thyratrons at the end of a predetermined time independently of rotation of the element, and a centrifugally operated switch means rotated by said rotatable element to make the latter part of the circuitry operable when the speed falls off.

17. A registration system as defined in claim 11, in which the reversing motor for phase adjustment may be operated at a higher speed and a lower speed, and in which there are switching means for manually controlled standstill phase adjustment which switching means automatically changes the motor to its higher speed operation.

18. A registration system as defined in claim 12, in which the reversing motor for phase adjustment may be operated at a higher speed and a lower speed, and in which there are switching means for manually controlled standstill phase adjustment which switching means automatically changes the motor to its higher speed operation.

19. A registration system as defined in claim 13, in which the reversing motor for phase adjustment may be operated at a higher speed and a lower speed, and in which there are switching means for manually controlled standstill phase adjustment which switching means automatically changes the motor to its higher speed operation.

20. A registration system as defined in claim 14, in which the reversing motor for phase adjustment may be operated at a higher speed and a lower speed, and in which there are switching means for manually controlled standstill phase adjustment which switching means automatically changes the motor to its higher speed operation.

21. A registration system for a multi-color printing line, in which each of the printing units is provided with apparatus as defined in claim 11, and in which the fine phasing (precision adjustment) of the phase detectors of all of the units takes place simultaneously.

22. A registration system for a multi-color printing line, in which each of the printing units is provided with apparatus as defined in claim 13, and in which the fine phasing (precision adjustment) of the phase detectors of all of the units takes place simultaneously.

23. Register control apparatus for maintaining the registration of a rotating element relative to a travelling web having markers, said apparatus comprising differently colored signal lamps controlled by relays which in turn are controlled by thyratrons having multiple grids, a phase detector connected to the rotating element for providing leading and lagging pulses with a dead zone therebetween, means to feed the leading pulses to one grid of one thyratron, means to feed the lagging pulses to one grid of the other thyratron, scanning means to produce pulses in response to the markers on the web, a vacuum tube blocking oscillator triggered by one end only of said scanner pulses to produce an exceedingly short pulse having a duration of only a few microseconds, means to apply said short pulse to another grid in each of the two thyratrons, and means so biasing the thyratrons as to fire only upon receiving coincident pulses on both grids.

24. Register control apparatus for maintaining the registration of a rotating element relative to a travelling web having markers, said apparatus comprising a reversible correction motor controlled by relays which in turn are controlled by thyratrons having multiple grids, a phase detector connected to the rotating element for providing leading and lagging pulses with a dead zone therebetween, means to feed the leading pulses to one grid of one thyratron, means to feed the lagging pulses to one grid of the other thyratron, scanning means to produce pulses in response to the markers on the web, a vacuum tube blocking oscillator triggered by one end only of said scanner pulses to produce an exceedingly short pulse having a duration of only a few microseconds, means to apply said short pulse to another grid in each of the two thyratrons, and means so biasing the thyratrons as to fire only upon receiving coincident pulses on both grids.

25. A register control apparatus for maintaining the registration of a rotating element relative to a travelling web having markers, said apparatus comprising a phase detector connected to the rotating element for providing leading and lagging comparison indicia with a uniformly maintained dead zone therebetween, scanning means responsive to the markers on the web to generate scan signals, means responsive to the scan signals to control timing of generated pulses, registration mechanism to keep the generated pulses located in the dead zone, said registration mechanism including means responsive to a drift by one side of the generated pulses to the adjacent side of the dead zone for causing correction in opposite direction, and means responsive to a drift by the other side of the generated pulses to the adjacent other side of the dead zone for correction in the then opposite direction, whereby the tolerance and accuracy of registration maintained by the apparatus is dependent on the timing of the generated pulses relative to the dead zone, and means for generating said generated pulses in response to one edge only of the scan signals, said means including a pulse generator arranged to generate an exceedingly short pulse having a predetermined fixed duration of only a few microseconds when operated, regardless of the size of the markers on the web.

26. Register control apparatus for maintaining the registration of a rotating element relative to a travelling web having markers, said apparatus comprising a phase detector connected to the rotating element for providing leading and lagging pulses with a uniformly maintained dead zone therebetween, scanning means to produce scanning pulses in response to the markers on the web, registration mechanism including a reversible motor controlled by relays which in turn are controlled by thyratrons having grids, means to feed the leading pulses to a grid of one thyratron, means to feed the lagging pulses to a grid of the other thyratron, circuit means responsive to one edge only of each of said scanning pulses to generate pulses having each a desired and uniform duration of only a few microseconds independently of the length of the scanning pulse and therefore independently of the size of the marker on the web, means to apply said generated pulses to a grid in each of the two thyratrons, and means so biasing each thyratron as to fire only upon receiving coincident pulses.

27. Register control apparatus for maintaining the registration of a rotating element relative to a travelling web having markers, said apparatus comprising a phase detector connected to the rotating element for providing leading and lagging comparison indicia with a uniformly maintained dead zone therebetween, scanning means to generate scan signals in response to the markers on the web, means responsive to the scan signals to time generated pulses, registration mechanism to keep the generated pulses located in the dead zone and including means responsive to a drift by one side of the generated pulses to the adjacent side of the dead zone for causing correction in opposite direction, and means responsive to a drift by the other side of the generated pulses to the adjacent other side of the dead zone for correction in the then opposite direction, whereby the tolerance and accuracy of registration maintained by the apparatus is dependent on the duration of the generated pulse relative to the dead zone, and a pulse generating means including a blocking oscillator circuit triggered in response to scanning by the scanning means of one edge only of the marker on the web to generate said generated pulses, said pulse generating means arranged to generate exceedingly short pulses each having a predetermined desired and uniform duration of only a few microseconds, the said duration of the said generated pulses being independent of the size or duration of the markers on the web.

References Cited in the file of this patent
UNITED STATES PATENTS

| | | |
|---|---|---|
| 2,211,002 | Cline | Aug. 13, 1940 |
| 2,348,862 | Sorkin | May 16, 1944 |
| 2,751,452 | Gaylore | June 19, 1956 |